(12) United States Patent
Levy

(10) Patent No.: US 9,390,584 B2
(45) Date of Patent: Jul. 12, 2016

(54) VERIFICATION SYSTEM FOR ON-LINE GAMERS PERFORMING AUTOMATIC VERIFICATION OF GAME RESULTS

(71) Applicant: WG LIMITED, Toronto (CA)

(72) Inventor: William Levy, Boynton Beach, FL (US)

(*) Notice: Subject to any disclaimer, the term of this patent is extended or adjusted under 35 U.S.C. 154(b) by 0 days.

(21) Appl. No.: 14/499,863

(22) Filed: Sep. 29, 2014

(65) Prior Publication Data

US 2015/0087409 A1    Mar. 26, 2015

Related U.S. Application Data

(62) Division of application No. 12/397,296, filed on Mar. 3, 2009, now Pat. No. 8,936,511.

(60) Provisional application No. 61/033,383, filed on Mar. 3, 2008.

(51) Int. Cl.
*G07F 17/32* (2006.01)
*A63F 13/46* (2014.01)
(Continued)

(52) U.S. Cl.
CPC ............ *G07F 17/3241* (2013.01); *A63F 13/12* (2013.01); *A63F 13/335* (2014.09); *A63F 13/352* (2014.09); *A63F 13/46* (2014.09); *A63F 13/79* (2014.09); *G06Q 50/34* (2013.01); *G07F 17/3288* (2013.01); *A63F 2300/407* (2013.01);
(Continued)

(58) Field of Classification Search
CPC . G07F 17/3241; G07F 17/3288; G06Q 50/34; A63F 13/12; A63F 13/79; A63F 13/335; A63F 13/352; A63F 13/46
See application file for complete search history.

(56) References Cited

U.S. PATENT DOCUMENTS 6,074,299 A    6/2000  Cohen
6,659,861 B1   12/2003 Faris et al.
(Continued)

FOREIGN PATENT DOCUMENTS

GB    2359640 A     8/2001
JP    2001198345 A  7/2001
(Continued)

OTHER PUBLICATIONS

"Tournament.com Ups the Ante for Counter-Strike: Source—Multi-level tournmaments and a true Deathmatch mode have been added", Oct. 15, 2007, IGN Entertainment, Inc., retrieved from http://www.charter.net/games.
(Continued)

*Primary Examiner* — John P Dulka
(74) *Attorney, Agent, or Firm* — Faegre Baker Daniels LLP

(57) ABSTRACT

An automatic verification system for automatically verifying a winner of an on-line game is disclosed. The verification system (a server/memory connected to the Internet) contains information about subscriber players and contains accounts that are used for betting on outcomes of skill games. The subscribers access the system via the Internet to set up an on-line game with other subscribers. The players then compete against each other normally via the game (e.g., Halo™ network server. The verification system then automatically receives the final game information from the server or console (s) via an e-mail, or by accessing published results of the game, or by accessing the players' published career summaries. Based on that automatically generated data, the verification system automatically determines the winner and awards the winner money or points.

6 Claims, 8 Drawing Sheets

(51) Int. Cl.
*A63F 13/335* (2014.01)
*A63F 13/79* (2014.01)
*A63F 13/352* (2014.01)
*A63F 13/30* (2014.01)
*G06Q 50/34* (2012.01)

(52) U.S. Cl.
CPC ..... *A63F 2300/513* (2013.01); *A63F 2300/537* (2013.01); *A63F 2300/5546* (2013.01); *A63F 2300/5586* (2013.01); *A63F 2300/61* (2013.01)

(56) References Cited

U.S. PATENT DOCUMENTS

| | | |
|---|---|---|
| 6,902,480 B2 | 6/2005 | Kidron |
| 6,999,083 B2 | 2/2006 | Wong et al. |
| 7,218,739 B2 | 5/2007 | Multerer et al. |
| 2002/0143867 A1 | 10/2002 | Horikawa |
| 2002/0183113 A1 | 12/2002 | Takahashi et al. |
| 2002/0183116 A1 | 12/2002 | Takahashi et al. |
| 2003/0087701 A1 | 5/2003 | Paravia et al. |
| 2003/0224856 A1 | 12/2003 | Bukovsky et al. |
| 2004/0224773 A1 | 11/2004 | Sham |
| 2005/0130728 A1 | 6/2005 | Nguyen et al. |
| 2005/0164762 A1 | 7/2005 | Smith et al. |
| 2005/0181870 A1 | 8/2005 | Nguyen et al. |
| 2006/0069731 A1 | 3/2006 | Hirao et al. |
| 2006/0080172 A1 | 4/2006 | Najarian et al. |
| 2006/0084499 A1 | 4/2006 | Moshal |
| 2006/0224761 A1 | 10/2006 | Howarth et al. |
| 2006/0240894 A1 | 10/2006 | Andrews |
| 2007/0004509 A1 | 1/2007 | Banton |
| 2007/0077994 A1* | 4/2007 | Betteridge ............ 463/42 |
| 2007/0078009 A1 | 4/2007 | Lockton et al. |
| 2007/0135208 A1 | 6/2007 | Betteridge |
| 2007/0265092 A1 | 11/2007 | Betteridge |
| 2008/0010106 A1 | 1/2008 | Bourne et al. |
| 2008/0033734 A1 | 2/2008 | Carry |
| 2008/0081700 A1 | 4/2008 | Biniak et al. |
| 2008/0096627 A1 | 4/2008 | Nadeau et al. |
| 2008/0220856 A1 | 9/2008 | Lynch et al. |
| 2008/0227552 A1 | 9/2008 | Shimomura et al. |
| 2008/0248844 A1 | 10/2008 | Gadda et al. |
| 2009/0048010 A1 | 2/2009 | Kroeckel et al. |
| 2009/0088235 A1 | 4/2009 | Stein et al. |
| 2009/0221365 A1 | 9/2009 | Levy |
| 2010/0022299 A1 | 1/2010 | Ryan |
| 2010/0062826 A1 | 3/2010 | Walker et al. |
| 2012/0088579 A1 | 4/2012 | Youm |
| 2013/0059656 A1 | 3/2013 | Kim et al. |
| 2013/0165233 A1 | 6/2013 | Wada |
| 2013/0231168 A1 | 9/2013 | Rogers |

FOREIGN PATENT DOCUMENTS

| | | |
|---|---|---|
| JP | 2002306853 A | 10/2002 |
| JP | 2002346231 A | 12/2002 |
| JP | 2003199977 A | 7/2003 |
| JP | 2004362545 A | 12/2004 |
| JP | 2005253591 A | 9/2005 |
| JP | 2005293591 A | 10/2005 |
| JP | 2007061472 A | 3/2007 |
| JP | 2008012151 A | 1/2008 |
| JP | 2008036242 A | 2/2008 |
| KR | 1020000037422 A | 7/2000 |
| KR | 1020000037442 A | 7/2000 |
| KR | 1020040107175 A | 12/2004 |
| KR | 1020060117062 A | 11/2006 |
| KR | 1020080035289 A | 4/2008 |
| WO | WO9719537 A1 | 5/1997 |

OTHER PUBLICATIONS

Buitelaar, Paul et al., "Generating and Visualizing a Soccer Knowledge Base", Proceedings of the 11th Conference of the European Chapter of the Association for Computational Linguistics: Posters & Demonstrations, 2006, pp. 123-126, Trento, Italy.

International Search Report and Written Opinion issued in PCT/US2009/035929, mailed Sep. 9, 2009, 6 pages.

Supplemental European Search Report issued in EP Application 09716980, completed Jun. 17, 2011, 8 pages.

* cited by examiner

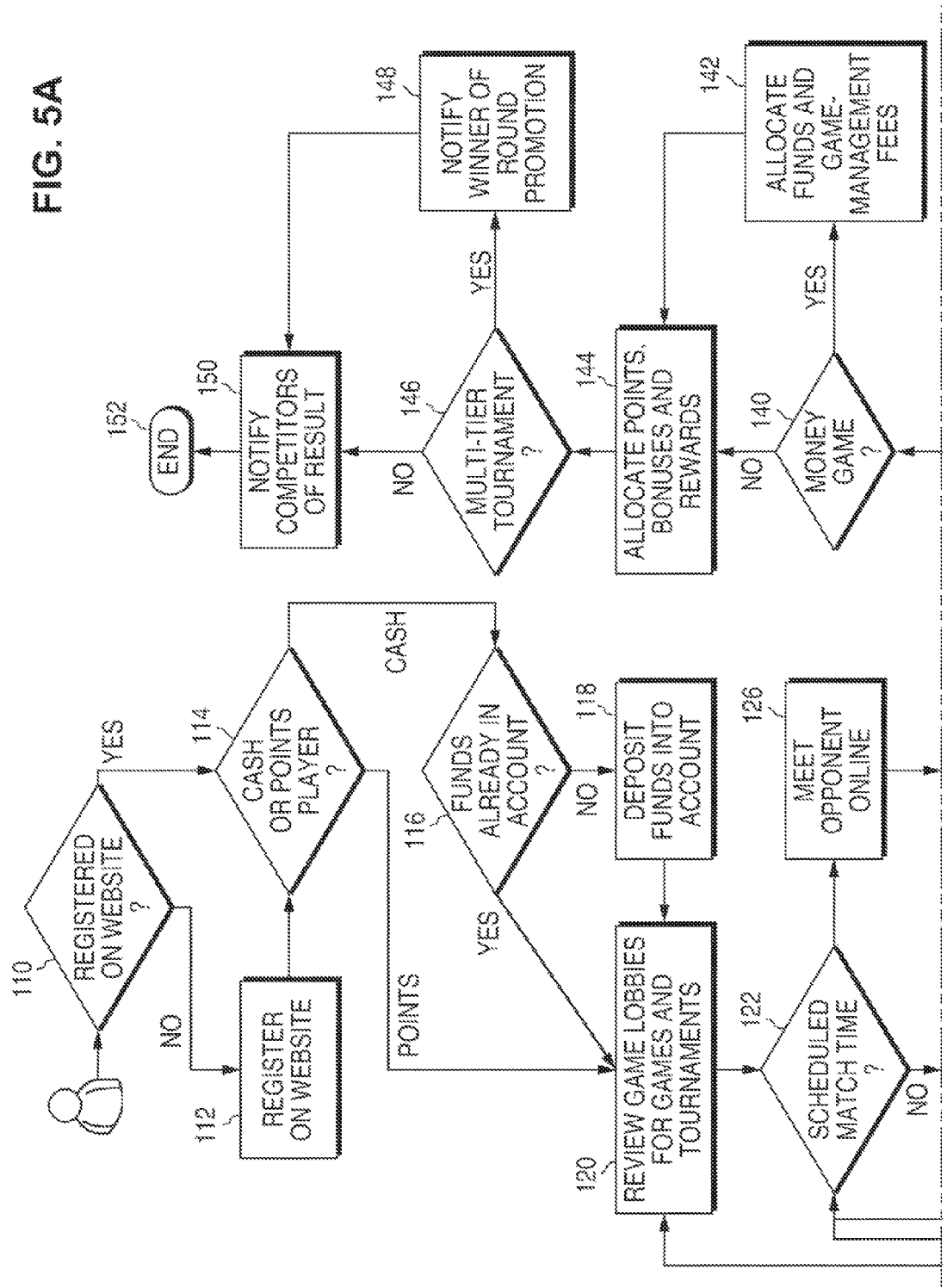

VERIFICATION SYSTEM FOR ON-LINE GAMERS PERFORMING AUTOMATIC VERIFICATION OF GAME RESULTS

CROSS-REFERENCE TO RELATED APPLICATIONS

This application is a divisional of U.S. patent application Ser. No. 12/397,296, filed Mar. 3, 2009, entitled "Verification System for On-Line Gamers Performing Automatic Verification of Game Results", which is based on, and claims priority from, provisional application Ser. No. 61/033,383, filed Mar. 3, 2008, entitled Wagering System for On-Line Gamers, by William Levy, both of which are incorporated herein by reference.

FIELD OF THE INVENTION

This invention relates to player vs. player interactive video games and, in particular, to a technique for the players to set up games via a remote system and the remote system automatically determining the winner and controlling the players' financial accounts or points.

BACKGROUND

Video game systems such as Microsoft's X-Box and Sony PlayStation have the capability of allowing players to compete against each other in video games via the Internet. For example, X-Box Live™ is directed to this feature. Almost 2 million players compete on-line each day playing Halo™, and other games are equally as popular.

Various on-line wagering systems are known that allow two players to open individual accounts, via a remote server, and place bets on the outcome of the video games. After the game is completed, the players must cooperate to manually enter the identification of the winner into the remote server. The remote server then credits the account of the winner and debits the account of the loser. Such wagering systems are described in US publication nos. 2007/0135208 A1 and US 2007/0004509 A1, both incorporated herein by reference. Other references describing remote interactive gaming include U.S. Pat. Nos. 6,999,083 and 7,218,739, both incorporated by reference. The present invention also applies to awarding the players points rather than money.

Problems arise if the players do not cooperate in identifying a winner to the remote wagering system.

What is needed is a verification system that automatically awards bets or points to winning players of on-line games, without requiring that the players manually enter the winner of the game.

SUMMARY

A verification system matches gamers with similar interests and skills, automatically keeps track of which players won on-line games, and grants money or points to the winning players. The players set up financial accounts via the Internet by, for example, depositing an amount of money into their account.

The verification system keeps track of thousands of players' game results and the players' competitors and automatically determines a player's relative skill level at the various games that can be played.

To protect the players from cheaters and bad gamers, a player rating system is set up that receives players' input about other players, and the system automatically rates players on their reputations based on wins/losses, amounts wagered, number of games played without a dispute, friend referrals, activity in the gaming forums, and number of games played.

Once a game is set up by two or more players for competing against each other in a video game, the players make wagers using any money in their accounts. The players then play against each other, independently of the verification system, using the conventional gaming networks offered by X-Box, PlayStation, Wii, and other advanced platforms. Typically, the platform provider, such as Microsoft for X-Box, provides a networking site that allows the players to easily initiate competitive games via the Internet, which are then played via the game provider's (e.g., Halo) server. The connection to the game server is set up by the platform provider (e.g., via X-Box Live). The game provider's server detects the players' controls and sends signals to all the players' consoles so all the consoles react accordingly while the players are entering commands. In one embodiment of a game server, the players' consoles are updated 30 times per second in response to players' commands.

After the game is completed, the verification system automatically communicates with the game server to obtain information regarding the outcome of the game, where the verification system is aware of the game due to the game being on a scheduled games list. The verification system then awards the winning player a monetary prize or points. In one embodiment, after the game is completed, the game server sends an e-mail to the verification system in a certain format indicating the results of the game. The verification system parses the e-mail to determine the winner and obtain other information and stores that information. In another embodiment, the game server or platform provider publishes the results of each game on a website, and the verification system automatically analyzes the results to determine the winner. In another embodiment, the game server or platform provider publishes the win/loss career summaries of each player, and the verification system automatically analyzes the results to determine the winner. The players' accounts are appropriately credited and debited by the verification system.

Even though there is automatic verification by the system without player involvement, the players still have an opportunity to dispute the game. The players have one hour after the game in which to register a dispute. A dispute team then immediately investigates the dispute. If the dispute is frivolous, the players' accounts are adjusted for the game outcome. If the dispute is adequate, the game is considered a draw and the bets are refunded minus a 10% dispute fee.

Examples of some video games that may use the verification system include Halo, Madden NFL 09, NCAA 09, Tiger Woods Golf 09, and NBA Live 09.

The verification system also is applicable to any competitive game of skill or chance, including on-line chess, backgammon, etc.

BRIEF DESCRIPTION OF DRAWINGS

FIGS. 5A and 5B are a flowchart showing an overall process for registering, setting up games, and automatically verifying results.

Like numbers refer to like elements throughout.

DETAILED DESCRIPTION

The present invention, referred to as a verification system (although it performs various other functions), will now be described more fully hereinafter with reference to the accompanying drawings, in which some, but not all embodiments of the invention are shown. This invention may be embodied in many different forms and should not be construed as limited to the embodiments set forth herein. Rather, these embodiments are provided to illustrate the general invention concepts. In one embodiment, the invention is carried out by a programmed verification server having a high speed Internet connection. Accordingly, the hardware may be conventional. One skilled in the art can program a server to perform the processes described herein without undue experimentation.

Glossary of Acronyms
   Automated Game Verification, or AGV
   Scheduled Games List (SGL)
   Game Identifier (GID)
   Competition Identifier (CID)
   Game Validation Process (GVP)

Figure 1:
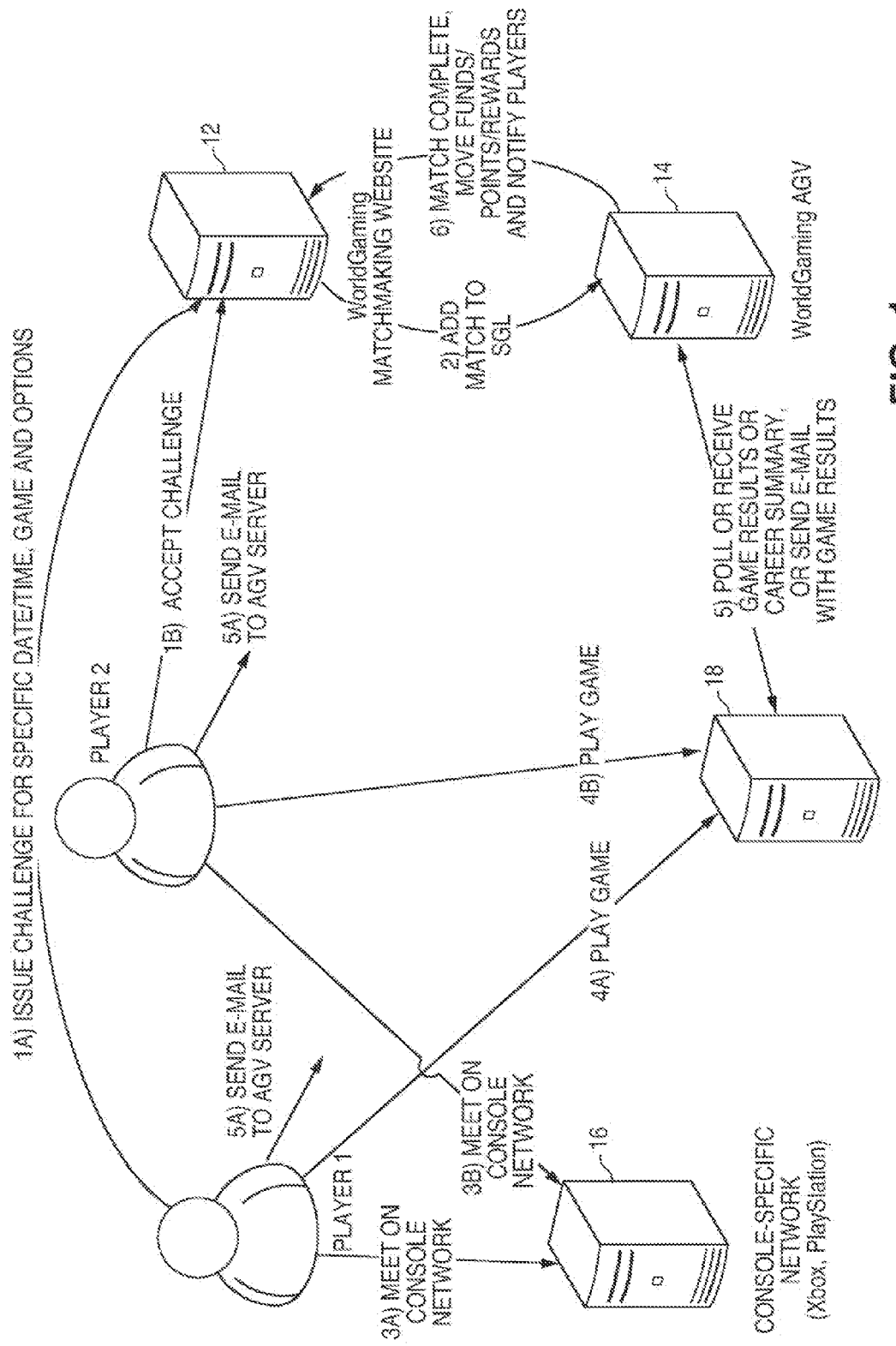
FIG. 1 is a diagram illustrating the major systems involved in setting up an on-line competitive game, playing the game, and automatically verifying the results of the game.

FIG. 1 illustrates an example of a network in which players may set up games using the verification system, play the games on-line, and have the game results automatically verified. The verification system includes servers to set up the game and verify the game.

Setting Up a Game

In FIG. 1, player 1 represents a player at an X-Box or PlayStation console or other type of video game console. Player 2 represents another player at an X-Box or PlayStation console or other type of video game console. The players are connected to the Internet with a high speed connection such as cable or DSL. One of the players uses the console (connected to a video display) to access the WorldGaming Matchmaking website server 12 and is led through instructions to set up a competitive game with another player by issuing a challenge. (The servers 12 and 14 identified in FIG. 1 include all memory for storing data and the operating program used to carry out the processes described herein.) At least the game type, players, and start time are designated by the player. The other player is notified of the challenge by the WorldGaming Matchmaking server 12 e-mailing a message to the player, and the player accepts the challenge by effectively checking a response box and transmitting the acceptance to the Matchmaking server 12. Both players must be registered with WorldGaming (the operator of the verification system) and have player IDs.

Once the match has been set up, any wagers, points, or other type of reward are verified as being available, and the match is confirmed to the players by an automatic e-mail generator. Other aspects of FIG. 1 will be identified during the below description of the game and verification process. The invention primarily relies in the verification-related aspects of the process.

The present invention includes a system and process to automatically determine a game winner using one of several methods, depending on the game. This process and method is hereinafter referred to as Automated Game Verification, or AGV.

At the early days of console video gaming players played against the computer. As the console and games evolved, players were able to play against one-another on a single console. As Internet access became more universal, and bandwidth increased, the games transitioned to allow players to play against one-another online, no longer requiring them to be physically collocated.

The most current trend in online console video gaming is to supply players with either per-game statistics and/or a career summary. For instance, some games, say a football video game, may show the user details about every game, such as points scored per quarter, possession time, etcetera. Others may provide career details such as total touchdowns, total running yards, total wins, total losses, etcetera.

The AGV is a continuously running process, performed by the verification system (identified in FIG. 1 as the WorldGaming AGV server 14), that monitors scheduled games and attempts to verify their results using a game-specific verification algorithm. The scheduled games list (SGL) is provided via a website, set up by the WorldGaming Matchmaking website server 12, that allows players to schedule head-to-head games, join multi-tier scheduled tournaments, participate in leagues, play as a team, and play in multi-player games. Multi-tier tournaments and leagues support both head-to-head, teams and multi-player competitions.

The scheduled games list (SGL) is ordered by earliest scheduled start time first and includes the following key data (as well as additional data not required for the AGV process):

Game identifier (GID)—identifies the game being played (e.g., NHL 09, Halo3, Madden 09). The player may select the type of game from a menu of games supported by the verification system, and the system automatically associates the game with the proper GID.

Competition identifier (CID)—identifies the specific competition, which relates to entry fees to join the competition and payout to the winner. The CID may also be tied to specific game options. The verification system automatically assigns this CID.

Scheduled start time—identifies when the game is supposed to start. If this is a tournament, the start time is determined by the verification system. If this is a game set up by the players, the players enter a time of day and date for the start of the game.

Gaming window—identifies how long the verification system should look for results. This may be an automatic window based on typically game durations. The verification system may begin looking for result, for example, 30 minutes after the start time and stop looking 4 hours after the start time.

Competitor list—identifies who is participating in this game. The players are subscribers of the verification system and are given ID codes. The game may be a head-to-head game, team game, or multi-player game.
      Head-to-head game: player1 vs. player2
      Team game: (player1-team1, player2-team1, . . . , playerX-team1), (player1-team2, player2-team2, . . . , playerY-team2), . . . ,(player1-teamN, player2-teamN, . . . , playerZ-teamN)
      Multi-player: player1, player2, . . . , playerN The GID provides game-specific information, such as, but not limited to:
   Game name
   Game logo
   Game type—sports, first-person-shooter, racing, etcetera.

Game validation process (GVP) (which may be customized for the particular game provider)

Supported video gaming console(s)

Minimum playing time—the shortest amount of time a game may take.

The CID provides competition-specific information, such as, but not limited to:

GID

Competition type (single game, multi-tier tournament, league)

Competitor type (head-to-head, team, multiplayer)

Game options (ranked or unranked, number of rounds/periods, duration of each)

Competitor list (same as SGL Competitor list)

Entry fee

Management fee

Winner rewards

Loser rewards

If multi-tier tournament, then next game where the winner should be promoted.

Playing a Game

Once the game is set up, the competing players then log onto the game console network 16 (FIG. 1), which would be a Microsoft game network for X-Box and a Sony game network for PlayStation. This is conventional. The console network then configures the player consoles to communicate directly with the game server 18 run by the game operator, such as Bungie, Inc. for Halo. The game is then initiated, with the game server 18 receiving game control signals (e.g., shooting commands) from the various players and controlling the players' consoles to react in a coordinated manner to all the players' control signals. Such game play is conventional.

Validating a Game Result

When the game is completed, the players log off, and the game validation process (GVP) is performed to determine the winner and award the winner a wagered amount, points, or other reward. The GVP is automatically performed by the WorldGaming AGV server 14 in FIG. 1.

One function of a GVP is to provide duplicate-processing protection. Consider a scenario where a set of players are playing multiple back-to-back games. Depending on the spacing of the games and the gaming window, it is possible that a SGL will include multiple games with the same game options and competitors. The challenge to the verification system is to ensure that the correct games are validated and specifically that a single game-played may not cause multiple games to validate.

The AGV process iterates through the SGL and, for each CID, triggers the GVP for the specific GID. The AGV process may also be responsible for the following tasks, although these are not required to fulfill its core function:

Cancel competitions that were not accepted by all parties

Notify players when their games were not validated by the expiration of their competition's gaming window.

Notify players of upcoming competitions for which they are enrolled.

There are currently three families of GVP, depending on how the game creators are supplying results. The verification system may, for example, use the GVP-DET-ONLINE verification process for Halo3 and the GVP-EMAIL process for a game that does not publish results. The three families are:

1. (GVP-EMAIL) End-of-game emails being automatically sent from the players' gaming consoles, game console provider, or game server (e.g., for Halo3). The console, game console network, or game server is preprogrammed to send the e-mail to the verification system's e-mail address, and the contents and format of the e-mail are precisely dictated by a software program.

2. (GVP-DET-ONLINE) Detailed results of each game are published online by the game server or game console provider and accessed by the verification system.

3. (GVP-SUM-ONLINE) Player career summaries are published online by the game server or game console provider and accessed by the verification system.

Each GVP family is discussed in further detail below.

In one embodiment, the GVP-EMAIL process requires that players configure their games to e-mail the end-of-game results to a specific e-mail address. A menu walks the players through a form-filling process on their consoles. This may only need to be done one time for all future games of a certain type. Ideally, the e-mail address is unique to each player, such as playerid@website.com, where the player includes his ID number in the address, but need not be so for this algorithm. This process requires that strict anti-spam measures be exercised to ensure forged results will not be accepted by the system. Anti-spam measures are widely available and beyond the scope of this disclosure.

In another embodiment, which is preferred since there is no player set-up, the game server sends an e-mail to the verification system (e.g., @worldgaming.com) after every game. Some game servers are already configured to send an e-mail to the players at the end of the game, and the e-mail address is changed to the worldgaming.com address instead of, or in addition to, the player's address. In another embodiment, the platform provider (e.g., X-Box Live) may send the e-mail. A simplified example of an e-mail to the verification system may be:

From: EA_Admin@ea.com

To: AGVserver@worldgaming.com

NCAA Football09

Mar. 3, 2009 at 11:30 pm

Final Score: joe z 36 vs. New BLUE 58

Statistics (detailed game statistics follow in the e-mail along with any other information pertinent to the game or connection)

The AGV algorithm programmed in the AGV server 14 performs the following steps to determine which game the e-mail relates and the outcome of the game:

Iterate through the verification system's e-mail inbox

Scan each e-mail to determine whether it matches the associated GID

This is performed by locating identifying patterns in the e-mail, such as the game name.

Determine game time (if not present in the e-mail, then use the 'sent-time' in the e-mail headers)

Determine whether the game time is within the range of the CID scheduled start time and gaming window Extract game participants Determine whether the participants match the CID Competitor List Check game status: Was the game fully played? Was there a disconnect? Some heuristics for this are game-specific. For example, some games provide the total possession time for each competitor. Since the CID includes game options, the algorithm can determine the expected total possession time, then add the possession time for each user to determine if the game was fully played. Heuristics can also be established to say that even if a game was disconnected, but still X % complete based on duration, possession time, or any other metric, that the system should count the results as valid.

If all the above conditions are met, then a potential match between the e-mail and the game has been found. The only remaining steps are to extract from the e-mail the score (and therefore winner), and determine whether this e-mail is a duplicate of an e-mail for the same game but from a different user. This is not an issue if the game server sent the e-mail. Score extraction is a game-specific text pattern-matching exercise. The e-mail format is predefined and the score for a certain game will typically always occur at a specific relative position in the e-mail.

Figure 2A:
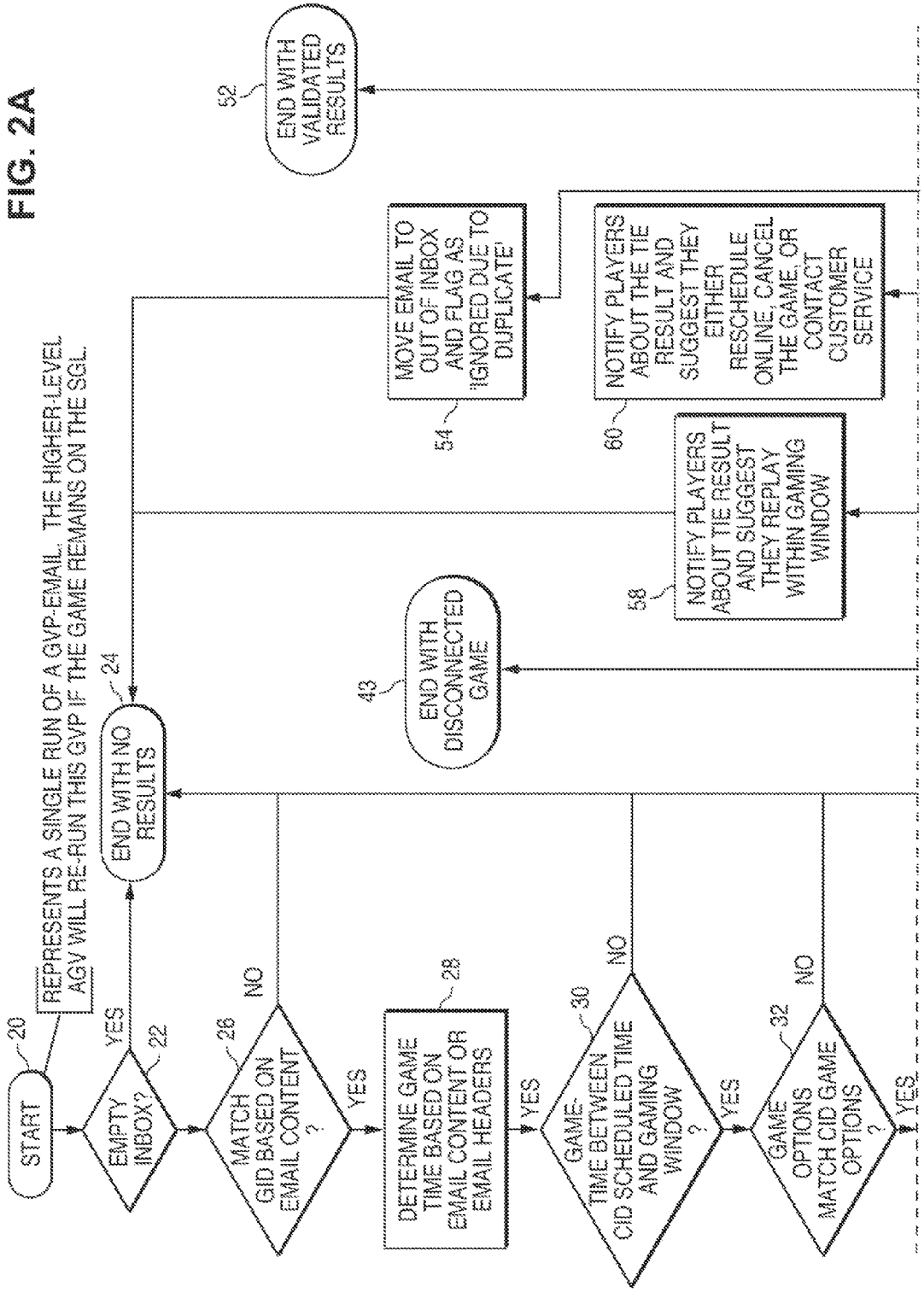
FIGS. 2A and 2B are a flowchart showing one verification routine using an e-mail sent by the game server, or by the game console provider, or by the player consoles to the verification system to determine the game winner.
Figure 2B:
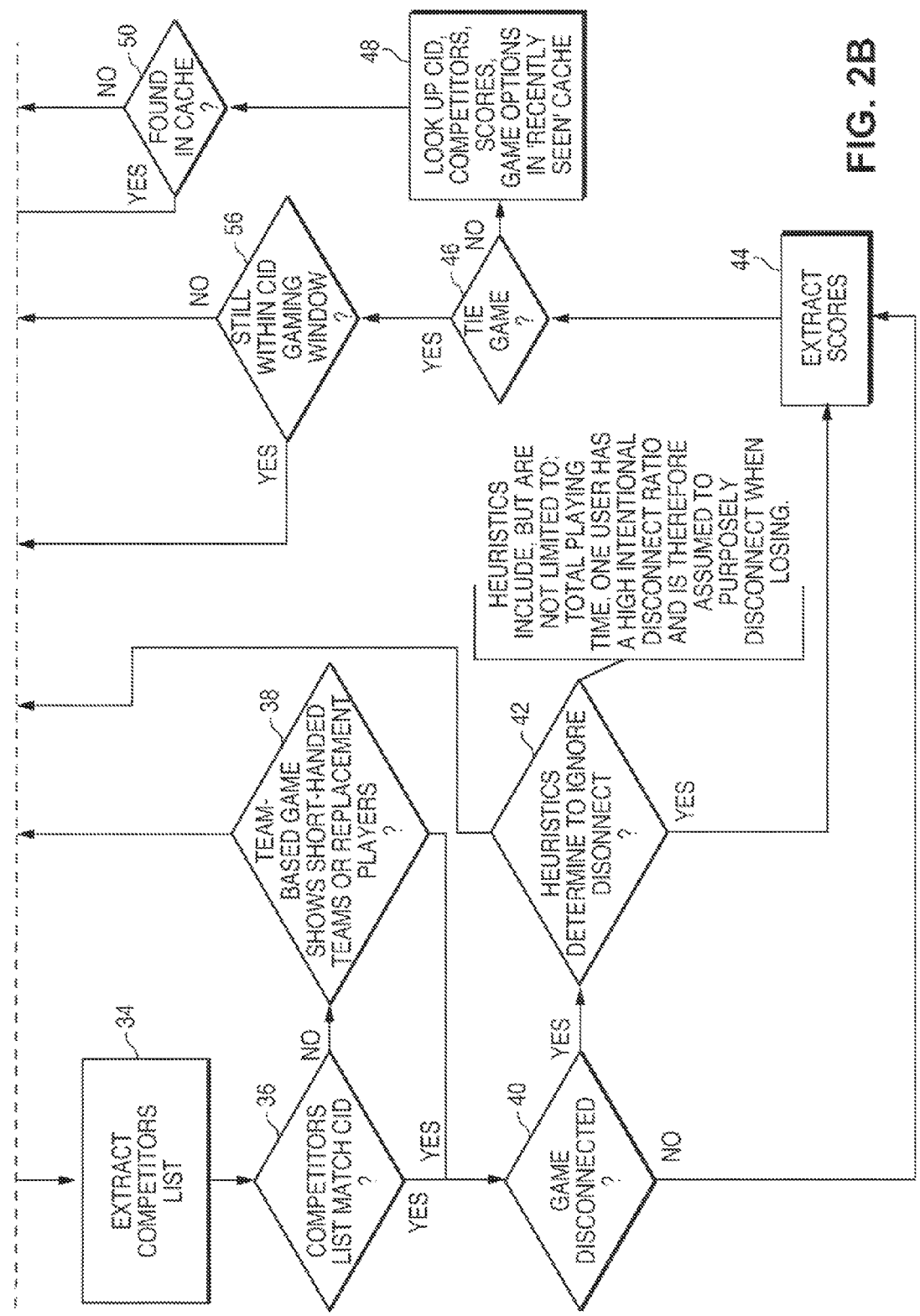

FIGS. 2A and 2B are a flowchart describing a verification routine using an e-mail sent by the game server to the verification system to determine the game winner. In step 20, the GVP-EMAIL routine starts. The routine will be repeated if the game on the SGL is not detected.

In step 22, the AGV server's e-mail inbox is checked. If it is empty (step 24) the process keeps looping to check the inbox.

If there is an e-mail, the game ID (GID) in the e-mail is detected in step 26 (e.g., words in the e-mail matched with corresponding game names in a look-up table). If the detected game time (step 28) of the competition (identified in the AGV server 14 as a Competition Identifier (CID)) occurred within a certain window after the scheduled start time in the SGL (step 30), it is determined that the e-mail still may be directed to the game in the SGL.

In step 32, any game options in the e-mail are cross-referenced to the CID game options. If there is a match, the competitors listed in the e-mail are extracted (step 34), to determine whether they match the competitors in the CID (step 36). If there is a provision for a team-based game to allow short-handed teams, a partial match of the players to the CID will not prevent the verification process from proceeding (step 38).

In step 40, it is determined from the e-mail whether the game was disconnected before completion. If not, the verification process continues. If so, certain rules (heuristics) are applied (step 42) to determine whether the game should count anyway, such as if the game was almost complete or if one player intentionally stopped the game when losing. If the game should not count, the game is classified as an invalid game and is ignored (step 43).

The above process provides assurance that the e-mail is directed to a particular game on the SGL. The scores are then extracted from the e-mail (step 44).

If the game is determined to be not tied (step 46), it is determined whether the e-mail is a duplicate (step 48) by looking up in a cache (step 50) whether the same scores, competitors, and game options were presented in a recent earlier e-mail. If the e-mail has been determined to not be a duplicate, the scores are validated (step 52) and acted upon by the AGV server 14, such as by awarding the winning player money or points, publishing the results on a webpage, and ranking the players.

If the e-mail is determined to be a duplicate, the e-mail is ignored (step 54).

If the game is a tie game (step 46) and the game time is still within a gaming window time (step 56), the players are presented with an option of replaying the game within the game window time (step 58). If the game window has expired, the players are notified about options such as rescheduling the game, cancelling the game, or contacting customer service for more options (step 60).

Duplicate-Processing Protection

The above-described GVP-EMAIL process contained steps to ensure that a duplicate e-mail will not be processed. Consider a scenario where player1 and player2 are scheduled for two competitions of the same game and options. The first competition is scheduled for 4:00 pm and the second at 4:30 pm. Now assume that there are e-mail delays, and results e-mails (automatically sent by each of the game consoles) are received by the verification system at 4:20 pm, 4:45 pm, 4:52 pm, and 5:31 pm. The challenge is to ensure that the correct e-mails validate the correct competition. Assume that the four e-mails validated competitions 1,1,2,2, respectively, or 1,2,2,1, respectively—there must be an algorithm to avoid mistaken validation of game 1 or 2.

To achieve this protection, the verification system's GVP-EMAIL process contains a cache of the validated competitors list, CID, scores, and extracted game options and game-specific unique information (such as home/away teams, etcetera) from past e-mails and other sources. At the end of its validation process described earlier, and right before validating a CID (i.e., verifying game results), it determines whether the same data points were 'recently' seen. The 'recently' parameter is adjustable and, through testing, it was determined that 2 hours was a reasonably successful timer. Therefore, repeat e-mails will essentially be ignored as applying to a game already processed by the verification system.

GVP-DET-Online

The GVP-DET-ONLINE process does not use e-mails for verification of scores and does not require players to configure anything on their side. Instead, the verification system polls an online location where detailed game results are published by the game authors (a trusted source). This location may be the Halo server having a website at bungie.net, for example. The publication of the game results by the game server on a website is conventional. The player's registered ID for the game server is automatically entered by the verification system after accessing the game server website after a game in order to access the player's personal game statistics. A simplified example may be as follows, which shows the general format of the game results.

Game Name
Date/time game played and finished
Platform game was played on
Players' Names
Game statistics, including final scores The AGV server 14 (FIG. 1) may be programmed to know the formats used by each game website to more easily extract the pertinent information to validate the game results.

The GVP-DET-ONLINE algorithm performs the following steps:
Select a player from the competitors list (this step is also used in duplicate-processing protection, discussed below).
Pull recent games for this player from the online source (e.g., Halo server, MLB09 server, etc.).
Determine game time
Determine whether the game time is within the range of the CID scheduled start time and gaming window
Extract game participants
Determine whether the participants match the CID Competitor List
Check game status: Was the game fully played? Was there a disconnect? Some heuristics for this are game-specific. For example, some games provide the total possession time for each competitor. Since the CID includes game options, the algorithm can determine the expected total possession time, then add the possession time for each user to determine if the game was fully played. Heuristics can also be established to say that even if a game was disconnected, but still X % complete based on duration, possession time, or any other metric, that the system should count the results as valid.

If all the above conditions are met, then a likely match has been found. The only remaining steps are to extract the score (and therefore winner), and determine whether this result was already processed to validate a different game. Score extraction is a game-specific text pattern-matching exercise. Since the game server website typically contains information in a certain format, it is easy to associate the data with its significance.

Figure 3A:
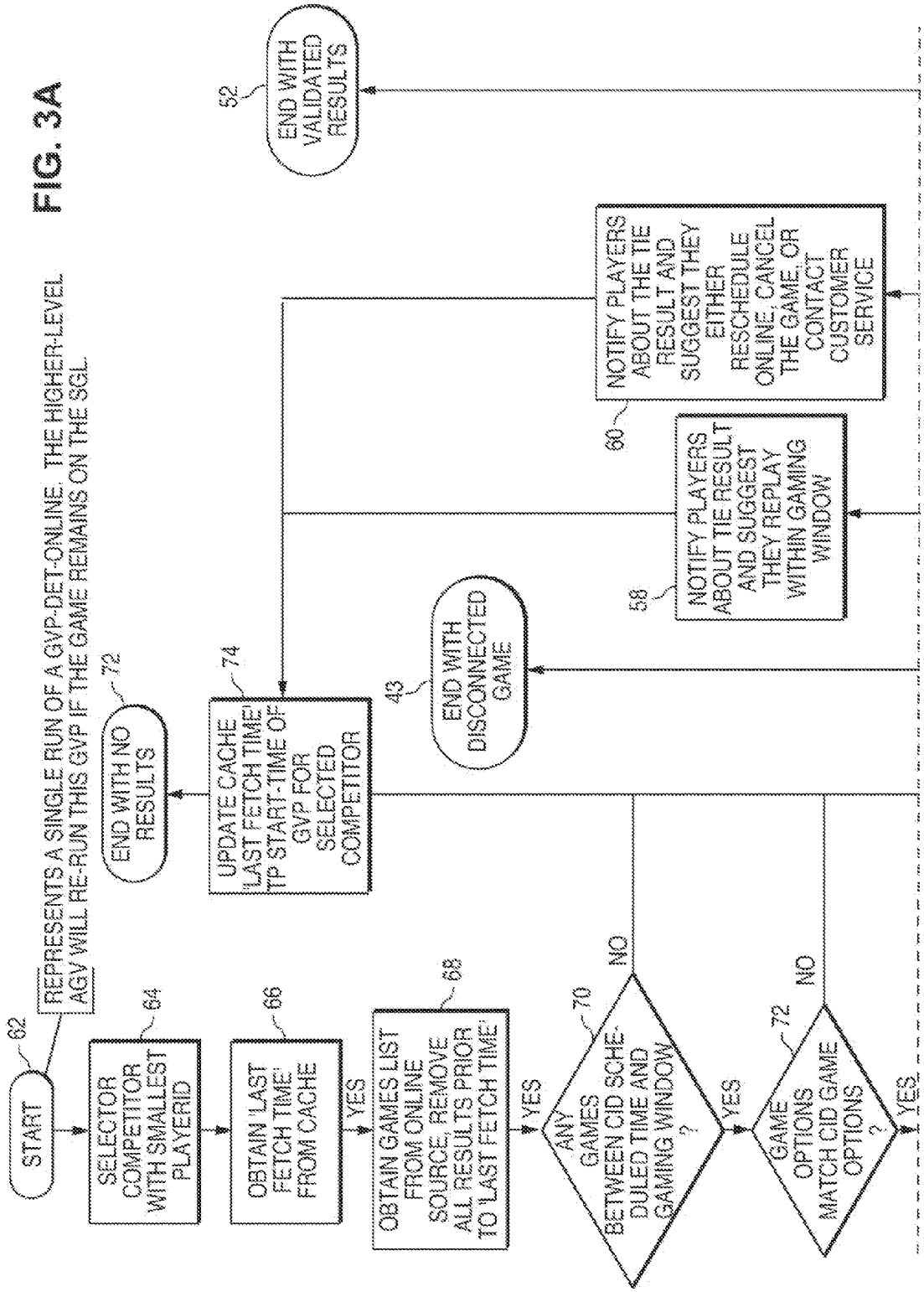
FIGS. 3A and 3B are a flowchart showing another verification routine using game results published by the game server or platform provider to determine the game winner.
Figure 3B:
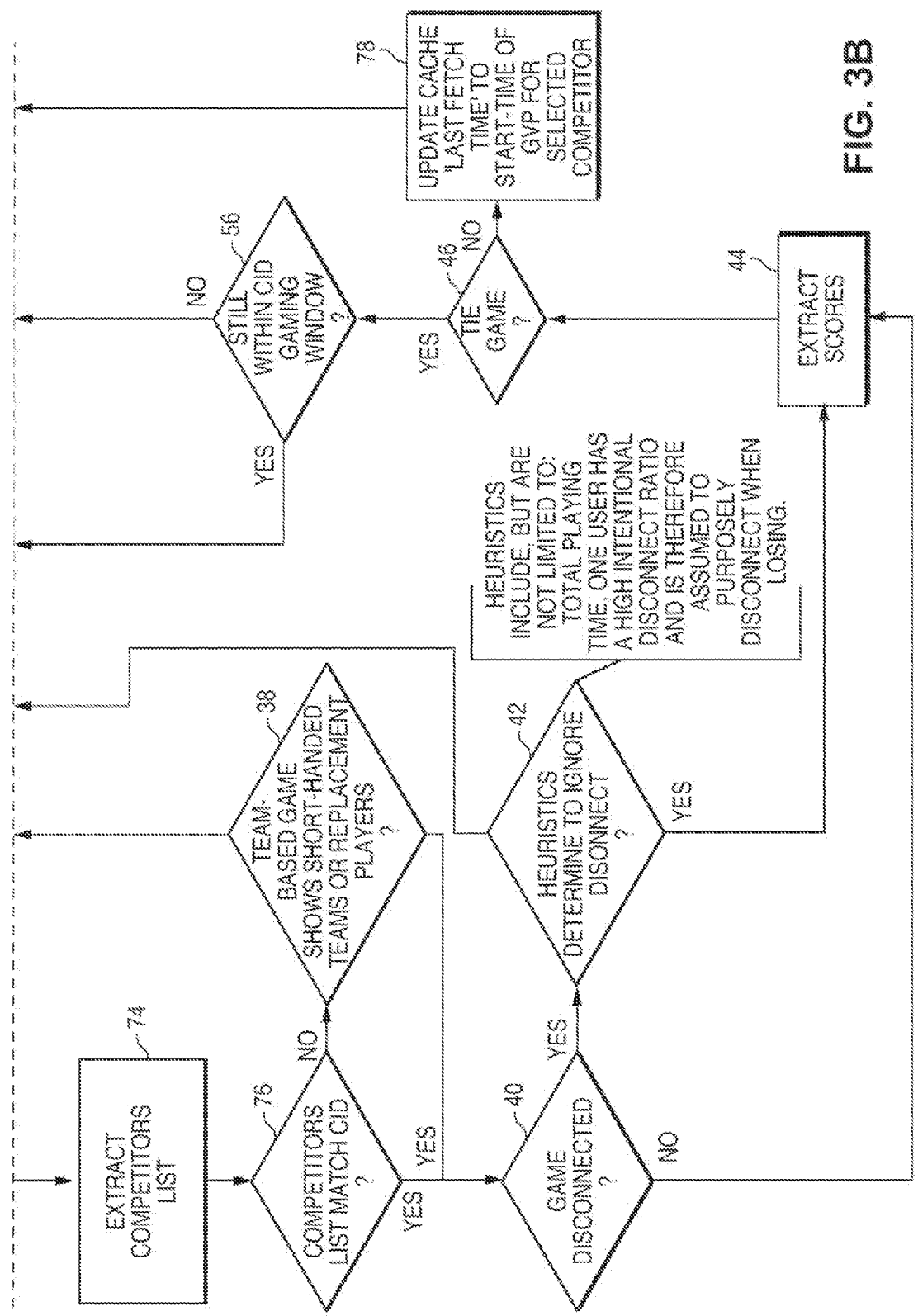

FIGS. 3A and 3B are a flowchart showing the GVP-DET-ONLINE process used to determine the game winner. In step 62, the routine starts. The routine will be rerun if the game results for a game listed on the SGL are not found.

Since the game server webpage for the particular game played will list all players, only one of the players needs to be identified to pull up the pertinent webpage. In step 64, the competitor with the smallest (numerically lowest) player ID number is used. The particular competitor is arbitrary, but only one is selected. In step 66, the last fetch time for games played by that player is obtained from the cache. In step 68, all games involving that player published by the game server prior to the last fetch time are ignored. In step 70, any games played by that player within a time window after the CID listed on the SGL are considered for being the target game on the SGL. If no games appear, then the game server website has not published the results (step 72), and the last fetch time is updated (step 74).

If a game is detected in step 70, it is determined from the webpage whether the game options match the CID game options in the SGL (step 72). If so, the competitors are extracted from the web page (step 74) and matched to the competitors on the CID (step 76). If there is a match, the game is assumed to be the target game on the SGL, and the scores are extracted from the webpage (step 44). Steps not specifically discussed in FIGS. 3A and 3B are identical to the same-numbered steps in FIGS. 2A and 2B and need not be repeated.

In step 78, the "last fetch time" is updated in the cache to the start time of step 62 for the particular competitor identified in step 64.

In another embodiment, the platform provider (e.g., X-Box Live) may publish the game results, and the verification server accesses that webpage.

Duplicate-Processing Protection

The above-described GVP-DET-ONLINE process contained steps to ensure that a duplicate e-mail will not be processed. Consider a scenario where player1 and player2 are scheduled for two competitions of the same game and options. The first competition is scheduled for 4:00 pm and the second at 4:30 pm. Now assume that the results are published at different times for the two users, for example at 4:20 pm and 4:45 pm for player1 and 4:52 pm and 5:31 pm for player2. The challenge for the verification system is to ensure that the correct results validate the correct competition.

To achieve this protection, the GVP-DET-ONLINE process contains a map of each player and the last time the system fetched its list of recent matches. When the GVP selects "a player from the competitors list," it uses an algorithm that, given the same set of players multiple times, will deterministically return the same player every time. There are multiple ways of achieving this, such as selecting the smallest playerid (i.e., the lowest player ID number amongst the competitors), largest playerid, first playername in alphabetical order, last playername in alphabetical order, etcetera. The exact method is not important, but the fact that the selected player is consistent is a requirement. This selection ensures that, when a competition with a set of players is validated, a particular player will be used to fetch the recent games, which avoids all potential duplicate-processing issues because identical results from that player will not be used to validate two games.

GVP-SUM-Online

The GVP-SUM-ONLINE process, like the GVP-DET-ONLINE process, does not require players to configure anything on their side. Instead, the system (the AGV server 14) polls an online location where a player's career summary statistics are published by the game authors (a trusted source). The publication of the career summary statistics by the game server on a website is conventional. The player's registered ID for the game server is automatically entered by the verification system after accessing the game server website after a game in order to pull down the player's personal career summary statistics. A simplified example may be as follows, which shows the general format of the game results.

Game Name
Experience (total number of games played)
Total points
Game statistics
Wins
Loses
Rankings of top players The AGV server 14 (FIG. 1) may be programmed to know the formats used by each game website to more easily extract the pertinent information to validate the game results.

The GVP-SUM-ONLINE algorithm performs the following steps at the beginning of each SGL scheduled start time. It is only performed one time per CID:
Fetch current career summary for each competitor
Store career summary for each competitor The above information provides the initial state for each competitor. Since only summary information is available, the algorithm must continuously fetch career summaries until all players' "games played" increases by one, and then use the "career winnings" and "career losses" fields to determine who recently won a head-to-head, multi-player or team-based game. This algorithm can also ensure that all team members participated, since it requires all the competitors to have an additional "games played". The algorithm must also adapt to scenarios such as one player running late and finishing a prior game right after the scheduled start time, causing his games-played to increase by one, but none of the other players' games to increase. The algorithm maintains all the players' states so that, if it sees that in order to validate the game it requires one player to increase games-played by more than others, it will only utilize the most recent changes to determine winners/losers.

Figure 4:
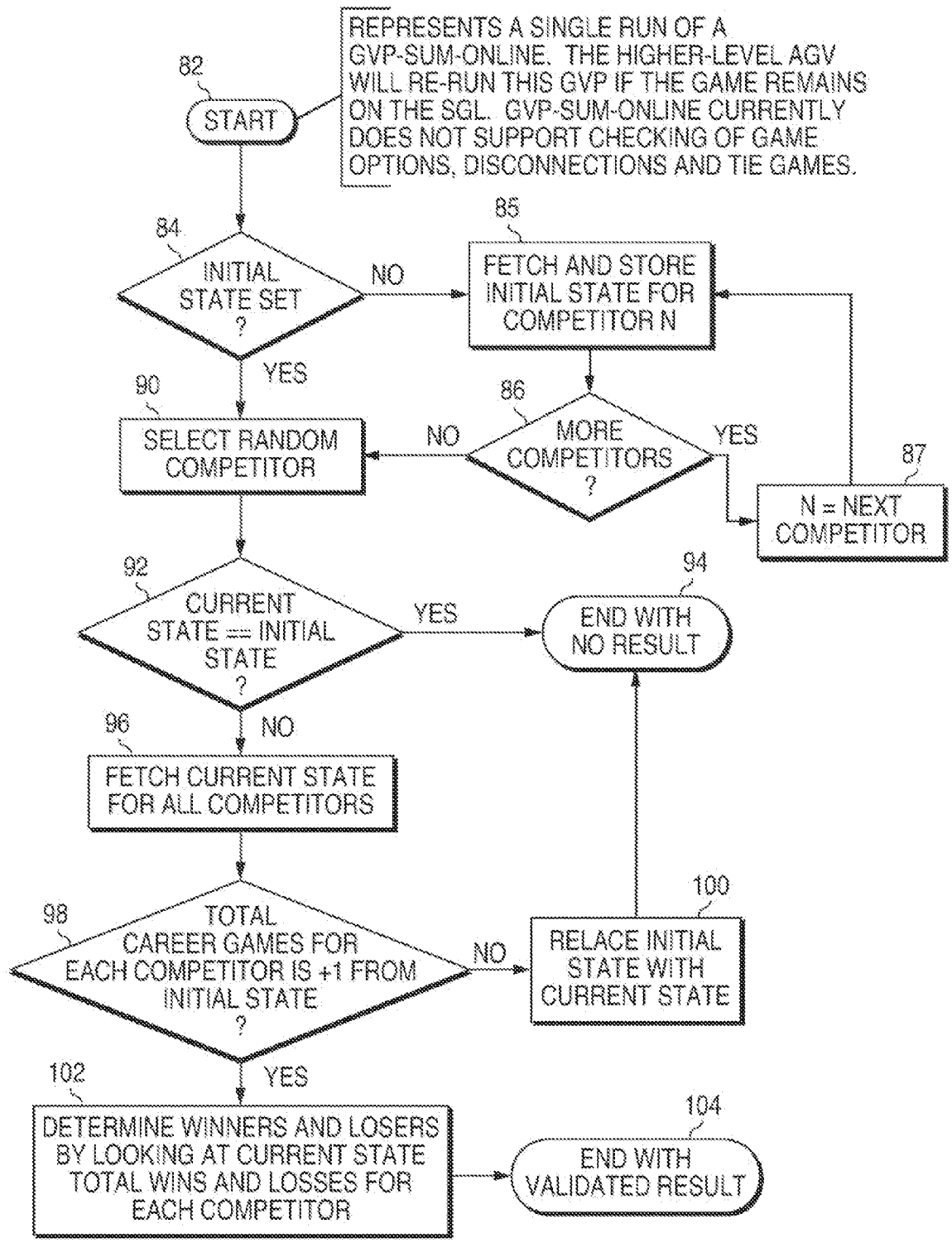
FIG. 4 is a flowchart showing another verification routine using players' win/loss career summaries published by the game server or platform provider to determine the game winner.

FIG. 4 is a flowchart showing the GVP-SUM-ONLINE process used to determine the game winner. In step 82, the routine starts. The routine will be rerun if the game results for a game listed on the SGL are not found.

In steps 84, 85, 86, and 87, an initial state (career summary) for all competitors of a particular game on the SGL is first set prior to game play. This will require accessing the players' career summaries from the game server website using the players' ID codes for that game server website. Once the initial states are set, and after it is assumed the game has been completed and the career summaries updated by the game server website, the website for one of the competitors (step 90) is selected to determine if there has been a change in his career summary (step 92). If there has been no change, no result is obtained (step 94) and the routine loops until a change has been detected.

If a change has been detected, the current states (i.e., the states updated after the game) for all the competitors are fetched from the website (step 96). In step 98, it is determined whether all the competitors' career summaries have been updated from the initial state (either wins or losses will be +1). If not, the initial state is replaced with the current state (step 100) and the routine loops until all the competitors' career summaries have been updated by the game server after the game.

Once it is determined that all the competitors' career summaries have changed, the AGV server 14 determines the winner(s) and loser(s) of the game by comparing the current wins and losses for each competitor to the initial states (step 102). The players' results are then validated (step 104) and winners are awarded appropriately by the AGV server 14 by, for example, crediting their account with any waged amounts by the players.

In another embodiment, the platform provider (e.g., X-Box Live) may publish the career summaries, and the verification server accesses that webpage.

Summary of Registration, Game Set-Up, and Validation Process

Figure 5B:
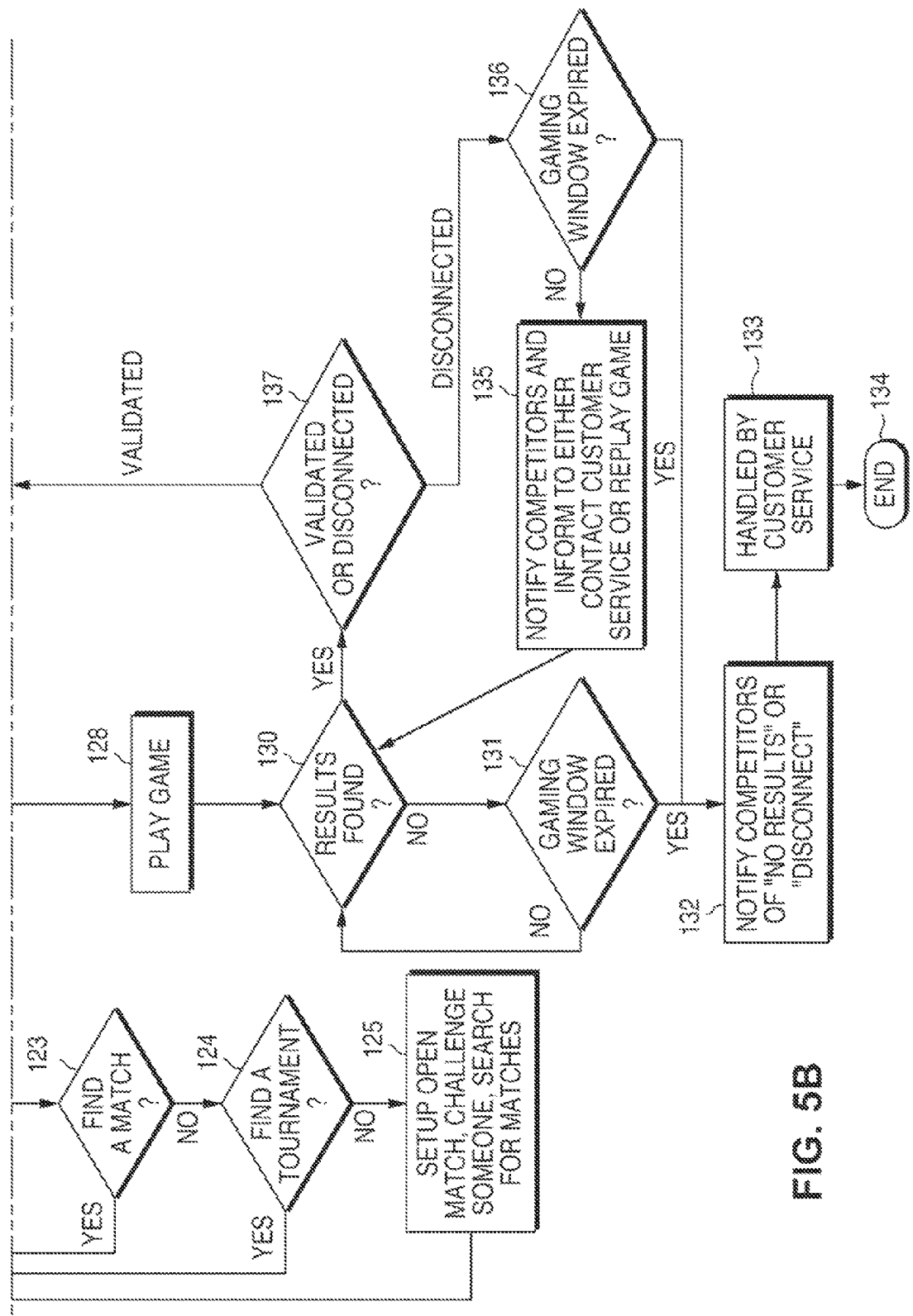

FIGS. 5A and 5B are a flowchart showing an overall process for registering, setting up games, and automatically verifying results. In steps 110 and 112, a player accesses the WorldGaming website to register. Part of the registration process is the player identifying his player ID(s) for accessing his personal game statistics from game server websites so the verification system can automatically access game information to determine who won games. For the embodiment where the player's console, game console provider, or game server sends an e-mail to the AGV server 14 after a game, this e-mail set-up may also need to be performed by the player.

Upon registration, all users will have their own dedicated home page that displays all their gaming details. Other users can view these pages and scope out their competition and leave comments on the comment board or add other users as friends etc. All profile pages also have challenge buttons on them. If a user clicks challenge, a challenge card opens that first asks that user to select a game that both users have in common. From here they are able to set all the details of the match and then issue it to the other user. The other user is then notified through e-mail via the worldgaming.com notification system. The other user can open the proposed challenged and chat live in real time with the other user and confirm all the match details and then accept the match.

In step 114, it is determined whether the player wants to play for cash or points. If the player wants to play for cash, the player deposits money into an account (steps 116, 118). The player is now registered and can set up challenges with other subscribers.

In step 120, the player enters the WorldGaming website and looks through "lobbies" for supported games and tournaments. The player then schedules a match time with another player or enters a tournament (steps 122, 123, 124, 125). Competitors may be automatically matched by WorldGaming based on the players' rankings The player may meet the opponent on-line (step 126) in a chat room.

There are three ways for users to issue/receive a challenge online:
1. Through the game lobby, all players online challenge process
2. Through the game lobby, Fast Play
3. Through Active Avatars and player profile pages Every game offered on the site has its own dedicated lobby that displays all users who are currently online on the website and have that specific game in their games list. The lobby displays the following user information: worldgaming.com username, site reputation, amount they like to play for, and a taunt. By clicking the challenge button, a challenge card is activated that allows the user to set the preferences for the selected game and use the challenge to the other user. The challenge card then acts as a live chat where the users are able to chat in real time and talk about the details of their game. The users then agree to the setting of the game and agree to the site's terms or service. The users are then issued a game confirmation number and are ready to go play the game.

There is a fast play button located in every lobby. Clicking "fast play" pulls up a challenge card that allows the user to set the details of the game they want to play. Instead of issuing the challenge to another user, fast play creates an open match that resides under the open match tab in the game lobby. All users can browse the open matches and then view the user they will be playing against and all the details of the match. Upon another user joining the open match both users are then set to play the game and issued confirmation details.

In step 128, the game is played at around the scheduled time. This is performed by the players independently of the verification system, and the players use conventional game networks set up by Microsoft, Sony, and other game console providers to play the on-line game.

The AGV server 14 (FIG. 1) then verifies the result of the game, using the processes described above and in FIGS. 2A and 2B, 3A and 3B, and 4. Such steps are identified by steps 131-137 in FIGS. 5A and 5B.

After the results are validated, the AVG server 14 then determines if the game was a money game (step 140) and, if so, allocates the funds and game management fees (e.g., 10%) (step 142). If the game was not a money game, the server 14 allocates points, bonuses, or other rewards to the player(s) (step 144). If the game is a multi-tier tournament game (step 146), the winner of the round is notified (step 148).

In step 150, the competitors are notified of the results of the game. The process then ends (step 152) until another game is played.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

The invention claimed is:

1. A method performed by a programmed verification server and associated memory remote from player video game consoles and remote from a game server running an on-line video game played on the consoles, the verification server, consoles and game server connected via a network, the method comprising:
   maintaining records of players;
   receiving inputs from players desiring to play a competitive game against each other on game consoles starting at a particular time;
   after the game has been played, independently of the verification server, using the game consoles and game server, automatically receiving by the verification server, without player involvement, information from the remote game server indicating results of the game sufficient to determine which player won the game;
   storing in a memory data indicating the winner of the game; and
   granting the winner an award,
   wherein the step of automatically receiving information comprises:
      receiving an e-mail from the remote game server by the verification server containing information about the game, the information comprising players' identifications, game identification, time of the game, and results of the game;

automatically detecting contents of the e-mail by the verification server identifying that the game played is a particular game scheduled for play by one of the players; and automatically detecting the results of the game from the e-mail; and wherein the step of storing in the memory comprises making the results available for viewing on a website and wherein the game consoles do not transmit the game results from the game server to the verification server.

2. The method of claim 1 wherein granting the winner an award comprises granting the winner a monetary award.

3. The method of claim 1 wherein granting the winner an award comprises granting the winner a monetary award and transferring money from a first account into the winning player's account.

4. The method of claim 1 wherein granting the winner an award comprises granting the winner points.

5. A programmed verification server remote from player video game consoles and remote from a game server running an on-line video game played on the consoles, the verification server, consoles and game server connected via a network, the server being programmed to perform the method comprising:
maintaining records of players;
receiving inputs from players desiring to play a competitive game against each other on game consoles starting at a particular time;

after the game has been played, independently of the verification server, using the game consoles and game server, automatically receiving by the verification server, without player involvement, information from the remote game server indicating results of the game sufficient to determine which player won the game;

storing in a memory data indicating the winner of the game; and granting the winner an award, wherein the step of automatically receiving information comprises:

receiving an e-mail from the remote game server by the verification server containing information about the game, the information comprising players' identifications, game identification, time of the game, and results of the game;

automatically detecting contents of the e-mail by the verification server identifying that the game played is a particular game scheduled for play by one of the players; and automatically detecting the results of the game from the e-mail; and wherein the step of storing in the memory comprises making the results available for viewing on a website and wherein the game consoles do not transmit the game results from the game server to the verification server.

6. The server of claim 5 wherein granting the winner an award comprises granting the winner a monetary award and transferring money from a first account into the winning player's account.

* * * * *